(12) United States Patent
Dama et al.

(10) Patent No.: US 10,966,805 B2
(45) Date of Patent: Apr. 6, 2021

(54) APPARATUS AND METHODS FOR SUPPORTING AND CHARGING A DENTAL DEVICE

(71) Applicant: DAJ DISTRIBUTION, INC., Los Angeles, CA (US)

(72) Inventors: Dave Dama, Los Angeles, CA (US); Li Dongbao, Shenzhen (CN)

(73) Assignee: DAJ GLOBAL PARTNERS LLC, Los Angeles, CA (US)

( * ) Notice: Subject to any disclaimer, the term of this patent is extended or adjusted under 35 U.S.C. 154(b) by 22 days.

(21) Appl. No.: 16/220,991

(22) Filed: Dec. 14, 2018

(65) Prior Publication Data
US 2020/0188073 A1 Jun. 18, 2020

(51) Int. Cl.
*A61C 17/22* (2006.01)
*A61C 17/36* (2006.01)
*A46B 15/00* (2006.01)

(52) U.S. Cl.
CPC ............ *A61C 17/224* (2013.01); *A61C 17/36* (2013.01); *A46B 15/0055* (2013.01); *A46B 2200/1066* (2013.01); *A61C 17/225* (2013.01)

(58) Field of Classification Search
CPC ..... A61C 17/224; A61C 17/36; A61C 17/225; A61C 17/22; H02J 50/10; H02J 50/70; H02J 50/90; A46B 15/0055; A46B 2200/1066; A46B 15/00
See application file for complete search history.

(56) References Cited

U.S. PATENT DOCUMENTS

2013/0257369 A1* 10/2013 Nazaroff ................ H02J 50/70
320/108

* cited by examiner

*Primary Examiner* — Vuthe Siek
(74) *Attorney, Agent, or Firm* — Hackler Daghighian Martino & Novak

(57) ABSTRACT

An assembly for supporting and charging a dental device. The assembly has three major components comprising a charging base, a rinsing cup and a dental device. The assembly allows the charging base to wirelessly charge the dental device when the dental device is placed within the rinsing cup, which is located on top of the charging base. The bottom interior surface of the rinsing cup has a convex dome that helps stabilize the assembly. The dental device further includes a magnet to ensure stability and promote reliable charging.

20 Claims, 5 Drawing Sheets

APPARATUS AND METHODS FOR SUPPORTING AND CHARGING A DENTAL DEVICE

FIELD

The present patent document relates generally to supporting and charging dental devices. More specifically, the present patent document relates to supporting and charging a dental device, such as a battery powered toothbrush or battery powered flossing device, in a rinsing cup placed on a charging base.

BACKGROUND

In recent years, studies have shown the advantages of using powered toothbrushes. Accordingly, numerous powered toothbrush products are sold on the market. These products typically use high frequency vibrations to help remove plaque and other debris from teeth. Numerous studies have proven the advantages of using powered toothbrushes over conventional brushing and thus, their use has become popular.

In addition to toothbrushes, other battery powered dental devices are also available such as dental picks and dental flossing devices.

All of these devices need to be repeatedly charged and are typically done so on charging devices that hold the dental device. These charging devices are often left on countertops next to bathroom sinks holding the battery powered dental devices and charging them between uses. Present charging devices acting as holders for dental devices are typically unsightly and perform no function other than charging the dental device between uses. These often clutter up bathroom sink areas.

One solution to unsightly dental device chargers is currently on the market. This solution provides a charging base and a rinsing cup that sits on the base. The dental device is placed inside the rinsing cup and is charged by the base. The rinsing cup camouflages the charger and may also serve as a cup for use in rinsing a user's mouth after brushing teeth or performing other dental care activities.

The problem with the present designs of these rinsing cup chargers is that the dental device can, and does, often knock over the entire assembly when placed in the rinsing cup. Because the dental device is held in the rinsing cup at an angle, if the user places the dental device vertically in the rinsing cup and let's go, the dental device may often fall towards the sides of the rinsing cup and then knock over the entire assembly when the dental device hits the side of the rinsing cup. Accordingly, if the user doesn't gently place the dental device in the rinsing cup at the correct angle, the entire assembly may be knocked over.

Another issue is that the rinsing cup can get stuck to the bottom of the dental device when the dental device is placed therein. If the user places the dental device vertically in the rinsing cup, on occasion the dental device will wedge itself into the rinsing cup such that it remains vertically and does not fall against one of the sides. In this situation, the rinsing cup often gets stuck to the bottom of the dental device. Accordingly, the rinsing cup can be accidently picked up when the user picks up the dental device for a subsequent use. This may cause the rinsing cup to drop and break or fall off and knock over the assembly or other items.

To this end, it would be beneficial to have a dental device that may be supported and charged in a rinsing cup without the potential for tipping over the entire assembly. In addition, it would be desirable to have a chargeable dental device that may be placed in the rinsing cup without the fear of the rinsing cup being stuck to the bottom of the dental device and subsequently falling off at an unwanted time.

SUMMARY OF THE EMBODIMENTS

Objects of the present patent document are to provide improved methods and apparatus for holding and charging a dental device. Another object of the present patent document is to provide methods and apparatus for holding and charging a dental device that eliminates or at least ameliorates some of the problems known in the art. To this end, an assembly for securing and charging a dental device is provided.

In some preferred embodiments, the assembly comprises: a charging base wherein the charging base includes electronics to wirelessly charge a power system and wherein the charging base has a top with a first interfacing surface that has a first flat center portion with a first protrusion that sticks up above the first flat center portion and surrounds the first flat center portion; a vessel having an interior surface and an exterior surface wherein the interior surface forms a cavity and wherein the exterior surface has a second interfacing surface designed to mate with the first interfacing surface wherein the second interfacing surface is on a bottom exterior surface of the vessel and wherein the second interfacing surface has a second flat center portion and a channel designed to receive the protrusion wherein the channel surrounds the second flat center portion and wherein the cavity has a cavity bottom and wherein a majority of the cavity bottom is covered by a second protrusion in the shape of a convex dome that is centered on the cavity bottom; and a dental device with a power system located therein and wherein the dental device has a handle and a magnet located proximal to a bottom of the handle.

In preferred embodiments, the dental device is an electric toothbrush. However, the dental device may be any type of dental device including a water pic, gum massager or any other type of dental device.

The height of the second protrusion in the bottom of the vessel is important. In some embodiments, the height of the second protrusion is between 1 mm and 5 mm. In other embodiments, the height of the protrusion may be less than 3 mm. In yet other embodiments, the height of the second protrusion may be between 1 mm and 10 mm. In yet other embodiments, the height of the second protrusion is 1 mm or less.

The second protrusion may cover different portions of the bottom interior surface of the vessel, a.k.a. the bottom of the vessel cavity. Preferably, the second protrusion is centered on the bottom interior surface of the vessel. In some embodiments, the second protrusion covers the entire bottom interior surface. In yet other embodiments, the second protrusion covers 90% or more of the cavity bottom. In still yet other embodiments, the second protrusion covers between 50% and 75% of the cavity bottom.

Preferably, the vessel is a cup or glass and even more preferably the vessel is a rinsing cup or rinsing glass. The vessel may be made of glass, plastic or many other different materials. In some embodiments, the vessel is transparent while in other embodiments the vessel is opaque.

In some embodiments, the exterior surface of the vessel includes a lip that extends down below the second flat center portion and surrounds the channel on the bottom exterior surface of the vessel.

In some embodiments, the walls of the first protrusion on the charging base that extend up from the first flat center portion to a top of the first protrusion form a ninety-degree angle with the first flat center portion.

The description above is just a summary of a few possible embodiments and a more detailed understanding may be obtained from the detailed description that follows along with reference to the drawings.

DETAILED DESCRIPTION OF THE PREFERRED EMBODIMENTS

Figure 1:
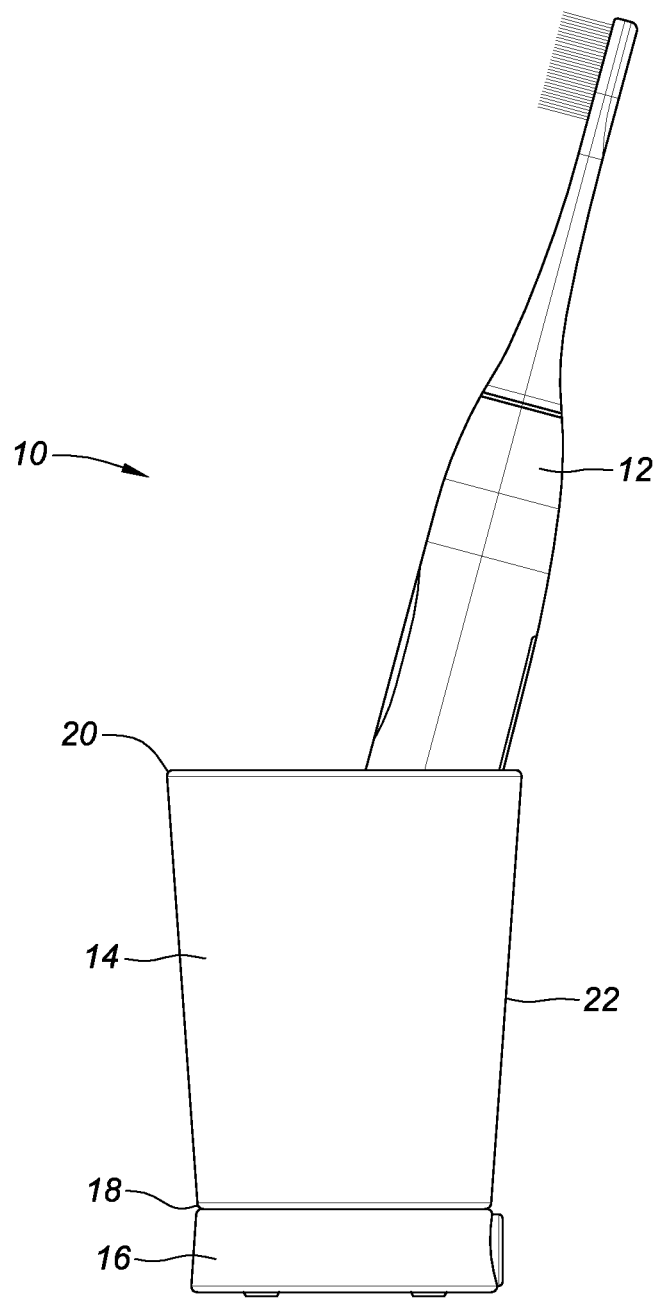
FIG. 1. illustrates an isometric view of a system for supporting and charging a dental device including a charging base and vessel.

FIG. 1 illustrates an isometric view of a system 10 for supporting and charging a dental device 12 including a charging base 16 and vessel 14. As may be appreciated, charging base 16, vessel 14 and dental device 12 are all separate components that may be assembled together to form an assembly. In operation, the vessel 14 is placed on the charging base 16 and the dental device 12 is placed inside the vessel 14. In such an embodiment, the dental device 12 has sufficient electronics therein to allow wirelessly charging of a power system by the charging base 16 through the vessel 14. In some embodiments, the power system located within the dental device 12 includes a pickup coil and the dental device has a handle and the pickup coil is located proximal to the bottom of the handle.

In preferred embodiments, the vessel 14 is made of glass, plastic, Pyrex®, ceramic, or some other material to allow charging of the dental device 12 through the vessel 14 by the charging base 16. The vessel 14 is meant to be used as a rinsing cup and is not permanently attached to the charging base 16 or the dental device 12 so that is may be used as a rinsing cup. As may be seen in FIG. 1, the vessel 14 may have an exterior that tapers from a smaller diameter at its bottom 18 to a larger diameter at its top 20. However, in other embodiments, the vessel 14 has vertical sides and accordingly, the bottom 18 of the vessel 14 has the same diameter as the top 20. As may be appreciated, many other shapes for the outside of the vessel 14 are possible.

In the embodiment shown in FIG. 1, the dental device 12 is a toothbrush and more particularly an electronic toothbrush. However, in other embodiments, the dental device 12 may be another type of dental device such as a flossing device, dental pic, water pic, gum massager or any other type of powered dental device 12. Dental device 12 is powered by a rechargeable electric system. This is typically achieved by storing energy in a battery but a capacitor or other type of energy storage device or any combination thereof may be used.

As may be seen in FIG. 1, the dental device 12 is held in the vessel 14 at an angle to vertical. However, in other embodiments the dental device 12 may be held vertically in vessel 14. In preferred embodiments, the bottom of dental device 12 is placed in the bottom of vessel 14 and the side of dental device 12 rests up against the side 22 of the vessel 14. Because in preferred embodiments, the vessel 14 has an increasing diameter from its bottom 18 to its top 20, the sides 22 of the vessel 14 are tipped at an angle to vertical. The amount the sides 22 are tipped with respect to vertical is proportional to the difference between the diameter of the vessel's top 20 and bottom 18.

Vessel 14 may be a cup, glass, rinsing cup, or any other type of vessel 14 that can hold dental device 12. Vessel 14 is removeable from the charging base 16 to allow the vessel 14 to serve as a rinsing cup. Accordingly, when a user is done using dental device 12, the user may remove vessel 14 from the charging base 16 and fill vessel 14 with a liquid, typically water or mouthwash, and rinse his/her mouth with the liquid.

Although the embodiment of the vessel 14 in FIG. 1 is round around its exterior, the vessel 14 may be any shape including triangular, square, pentagon, hexagon or any other shape. The vessel 14 may have chamfered or rounded corners or may have sharp corners.

Figure 2:
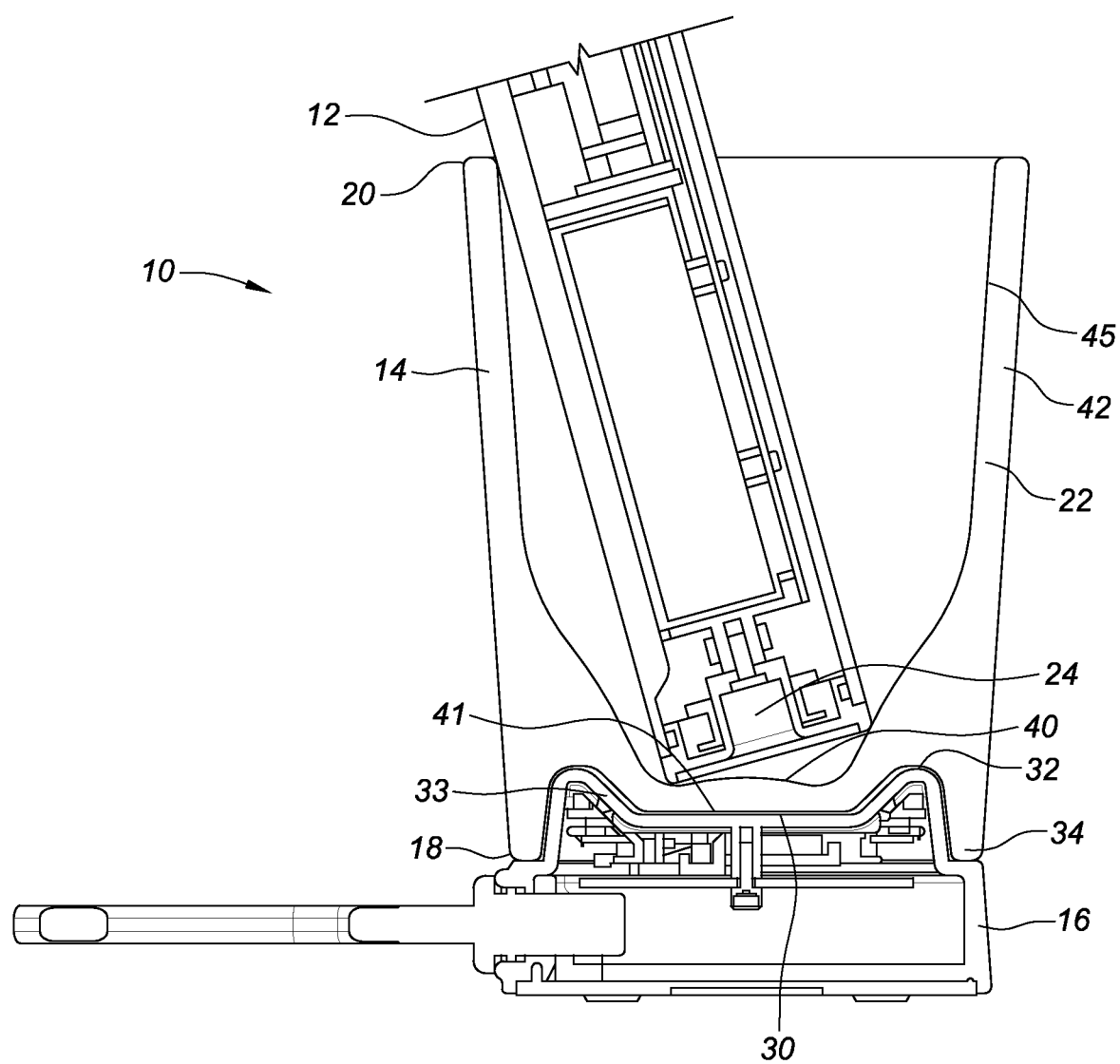
FIG. 2 illustrates a cross-sectional view of the embodiment of the system for supporting and charging a dental device of FIG. 1.

FIG. 2 illustrates a cross-sectional view of the embodiment of the system 10 for supporting and charging a dental device 12 of FIG. 1. As may be seen in FIG. 2, the charging base 16 has a first interfacing surface 30 for interfacing with the bottom of vessel 14. As may be seen in this embodiment, the first interfacing surface 30 has a flat center portion with a first protrusion 32 that sticks up above the first flat center portion and surrounds the first flat center portion. The protrusion is necessary to create a place for a charging coil to reside that is above the bottom of the vessel. Accordingly, a charging coil is wound around an interior of the first protrusion 32.

In preferred embodiments, the first protrusion 32 extends all the way around the charging bottom 16 to create a depression to receive vessel 14. However, in other embodiments the first protrusion 32 may be on a subset of sides of the vessel 14. For example, the first protrusion 32 may extend up on two or three sides and not all the way around the vessel 14. In the embodiment of FIG. 2, the flat center portion of the first interfacing surface 30 forms the bottom of the depression and the first protrusion 32 forms the walls 33 of the depression.

In the embodiment shown in FIG. 2, the walls 33 of the depression have a slope from the bottom 30 up to the top of the protrusion 32. However, in other embodiments, the walls 33 of the depression may be vertical, or approximately vertical, from the bottom of the depression to the top of the protrusion 32. By vertical the Applicant means generally vertical or approximately 90 degrees and any small angle that is required to allow the part to be extracted from a mold is within the scope of vertical as used herein. In the embodiment shown in FIG. 2, the slope of the walls 33 are approximately 45 degrees but other slopes may be used. In embodiments with sloped walls 33, the slope will typically be between 30 degrees and 60 degrees.

As may be seen in FIG. 2, vessel 14 includes a second interfacing surface 41 designed to mate with the first interfacing surface 30 of the charging base 16. The second interfacing surface 41 is on the bottom exterior surface of the vessel 14. The second interfacing surface 41 has a flat center portion and a channel that surrounds the flat center portion. The flat center portion of the second interfacing surface 41 is designed to mate with the flat center portion of the first interfacing surface on the charging base. The channel portion of the second interfacing surface 41 on the vessel 14 is designed to accept the protrusion 32 from the first interfacing surface on the charging base.

The vessel 14 has an interior surface 45 and an exterior surface 42. The interior surface 45 of the vessel 41 has a generally concave shape down into the vessel 14. However, through extensive research, Applicant has discovered that placing a protrusion 40 centered on the bottom 41 of the interior surface 45 of the vessel 14 can alleviate many of the problems of the prior art. Protrusion 40 forms a convex interior bottom 41 on the generally concave interior surface 45 of vessel 14. In preferred embodiments, protrusion 40 is shaped like a convex dome and is centered on the bottom of the vessel 14.

Protrusion 40 preferably matches the shape of the vessel. To this end, protrusion 40 may be round if the interior of the vessel is round. However, if the vessel is some other shape, the protrusion 40 may match that shape. It is possible to have a protrusion 40 that is not the same shape as the vessel 14 and still be within the scope of the embodiments here; however, a protrusion 40 that matches the shape of the interior of the vessel is preferred. By matching the shape of the interior of the vessel, the interface between the protrusion 40 and the walls 22 of the vessel 14 remains consistent. This promotes a consistent performance of the protrusion 40.

Protrusion 40 can be any size but preferably has a height above the generally flat interior bottom of vessel 14 between 1 mm and 10 mm and more preferably between 1 mm and 5 mm and even more preferably is approximately 3 mm high. Protrusion 40 is centered in the middle of the vessel 14 such that the high point of the protrusion 40 is aligned with the vertical axis of symmetry of the vessel 14.

The convex dome 40 on the bottom of the interior surface of the vessel 14 encourages and/or forces the dental device 12 to be placed into the vessel at an inclination from vertical. By forcing the dental device 12 to be placed into the vessel 14 at an inclination, the convex dome 40 prevents the dental device from being placed in vertically or close to vertically. By preventing a vertical orientation of dental device 12, the convex dome 40 prevents the dental device 12 from falling against the side 22 of the vessel 14 and knocking over the entire assembly, as often happens in existing designs. One skilled in the art would not expect this result because it is counterintuitive to make the interior bottom 41 of the vessel 14 uneven to create a more stable assembly 10.

In addition, the protrusion 40 also prevents the dental device from wedging all the way into the bottom of the cavity of the vessel and getting stuck. Because the vessel can no longer get stuck to the bottom of the dental device, there is no danger of having the vessel be picked up off the assembly with the dental device and subsequently fall off and break.

Moreover, when designing a wireless charging assembly, it is desirable to have the device 12 sit as low as possible within the vessel 14. This is why all previous designs use a concave bottom on vessel 14. One skilled in the art would not find it obvious to create protrusion 40 in the bottom of vessel 14 because it can interfere with the wireless charging of dental device 12 by the charging base 16.

Through extensive testing, Applicant has invented the embodiments herein and proven that by including a protrusion 40 in the shape of a convex dome on the bottom surface of vessel 14, a superior design results. Moreover, a properly shaped protrusion 40 still allows for wireless charging between charging base 16 and dental device 12 while preventing the device 12 from tipping over the entire assembly 10.

Figure 3:
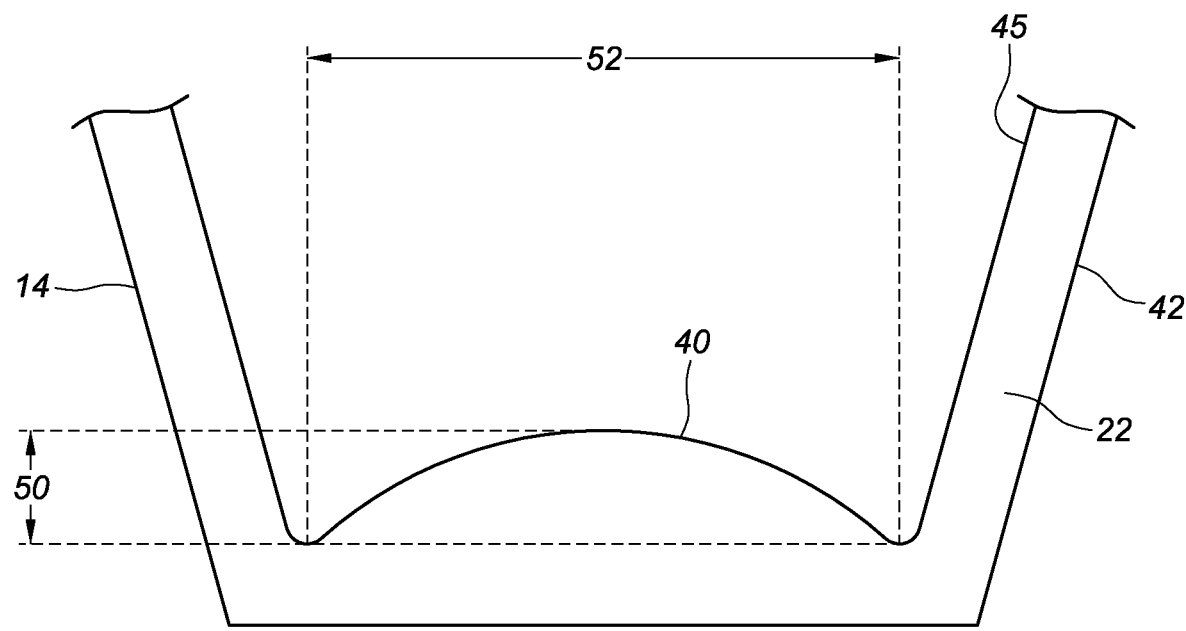
FIG. 3 illustrates a cross-sectional view of a bottom portion of a vessel for use with a charging base and dental device.

FIG. 3 illustrates a cross-sectional view of a bottom portion of a vessel 14 for use with a charging base and dental device. As may be seen in FIG. 3, in some embodiments, the protrusion 40 may extend across the entire bottom interior surface 45 of vessel 14. In other embodiments, protrusion 40 may have a smaller diameter 52 than the bottom interior surface 45 of vessel 14. In embodiments, with protrusions 40 that have a diameter 52 smaller than the bottom interior surface 45, the bottom interior surface 45 may be flat surrounding protrusion 40 or may be concave around protrusion 40. In the embodiment shown in FIG. 5, the protrusion 40 curves around and transitions into the interior surface 45 of the side walls 22 of the vessel 14.

In preferred embodiments, the protrusion 40 has a diameter 52 that is at least 50% or more of the diameter of the bottom interior surface 45 of the vessel 41. In yet other embodiments, the protrusion 40 has a diameter 52 that is 75% or more of the diameter of the bottom interior surface 45 of vessel 14. In yet other embodiments, the protrusion 40 has a diameter 52 that is 90% or more of the diameter of the bottom interior surface 45 of vessel 14. In yet other embodiments, the protrusion 40 covers the entire bottom inside surface 45 of vessel 14.

The height 50 of the protrusion 40 is also important. If the protrusion 40 is too tall, it could impede the dental device 12 from charging via the charging base 16. The allowable height 50 for the protrusion 40 may be dependent on the diameter of the protrusion 40. In embodiments where the protrusion 40 takes up the entire diameter of the bottom interior surface 45 of the vessel 14, the allowable height 50 of the protrusion 40 is less than if the diameter 52 of the protrusion 40 is smaller. In preferred embodiments, the protrusion 40 has a 5 to 1 or greater width 52 to height 50 ratio. In yet other embodiments, the protrusion 40 has a 10 to 1 or greater width 52 to height 50 ratio. In yet other embodiments, the protrusion 40 has a 20 to 1 or greater width 52 to height 50 ratio.

In embodiments where the protrusion covers the entire bottom interior surface 45 of the vessel 14, the protrusion 40 may have a 5 mm or smaller height 50.

Assuming the interior of the vessel 14 is generally considered concave, the bottom of the interior surface may be considered convex due to the protrusion 40. In yet other embodiments, the protrusion 40 may make only a portion of the bottom interior surface 45 of vessel 14 convex.

Figure 4:
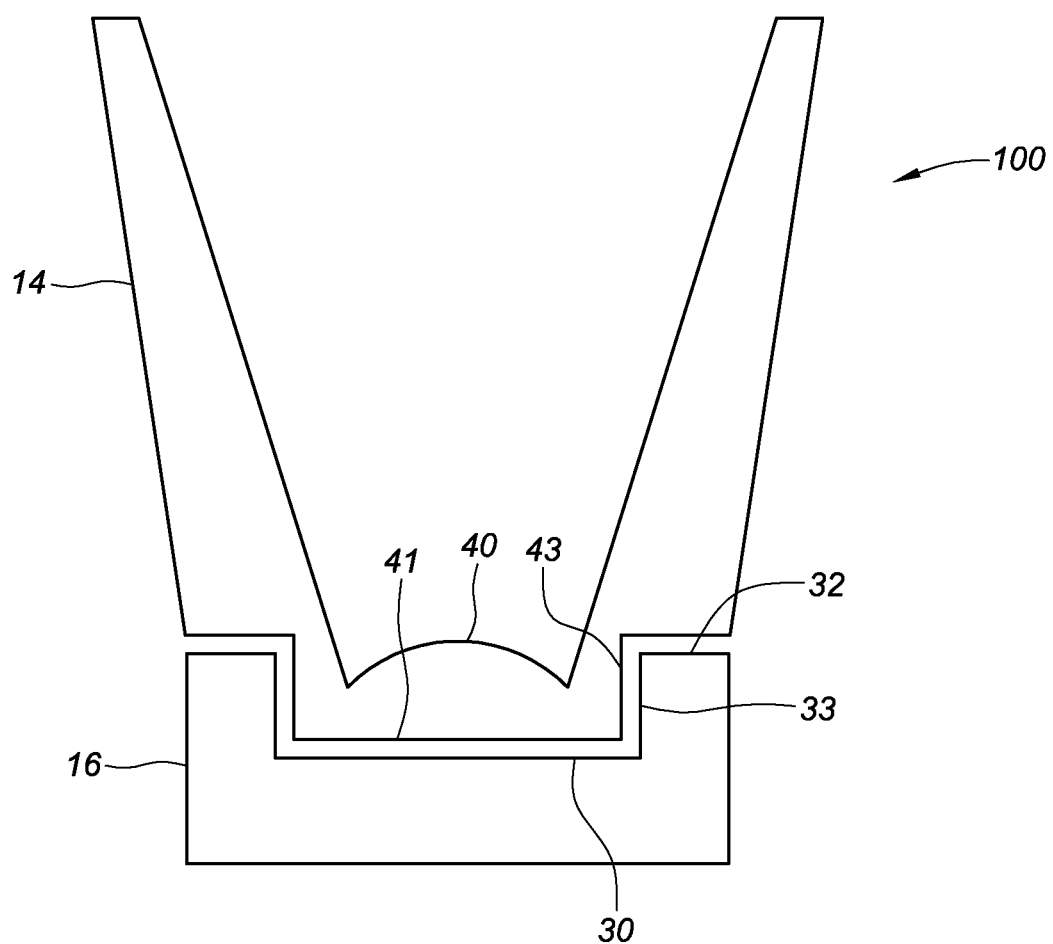
FIG. 4 illustrates a cross-sectional view of a system for supporting and charging a dental device where the walls of the charging base are vertical from the flat center portion of the first interfacing surface up to the top of the protrusion.

FIG. 4 illustrates a cross-sectional view of a system 100 for supporting and charging a dental device where the walls 33 of the charging base 16 are vertical from the flat center portion of the first interfacing surface 30 up to the top of the protrusion 32. As may be appreciated, the vessel 14 also has vertical walls 43 to mate to the vertical walls 33 of the charging base 16.

The designs of the vessels in the embodiments of FIG. 2 and FIG. 4 have differences. Returning back to FIG. 2, the vessel 14 includes a lip 18 that is designed to wrap around protrusion 32 of charging base 16. As may be seen in FIG. 2, the vessel 14 slopes up from the bottom surface 41 to the top of protrusion 32 and then curves down over the protrusion 32 to outside lip 18. This creates a channel with three sides to interface with protrusion 32 of the charging base 16. Outside lip 18 is the lowest point on the vessel 14 and forms the ultimate bottom of the vessel 14 when the vessel 14 is not resting on the charging base 16.

In contrast, the embodiment shown in FIG. 4 has a vessel 14 with walls 43 that are at right angles to the bottom 41. In FIG. 4, the walls 43 of the vessel 14 extend up vertically from the flat bottom 41 to approximately the top of protrusion 32 and then extend over protrusion 32 to approximately the outside edge of the charging base 16. Finally, the vessel walls 22 slope up to form the sides of the vessel 14. As may be appreciated, the embodiment of the vessel 14 shown in FIG. 4 does not have the lip 18 like the vessel of FIG. 1. Moreover, the channel formed to mate with the protrusion 32 of the charging base has only two sides and is open around its exterior.

Another difference in the vessel 14 in the embodiments shown in FIG. 2 and FIG. 4 is the shape of the bottom surface 41 of the vessel 14. As may be seen in FIG. 2, the vessel has a slight indentation. However, as shown in FIG. 4, a flat bottom surface 41 of the vessel 14 is preferable.

Figure 5:
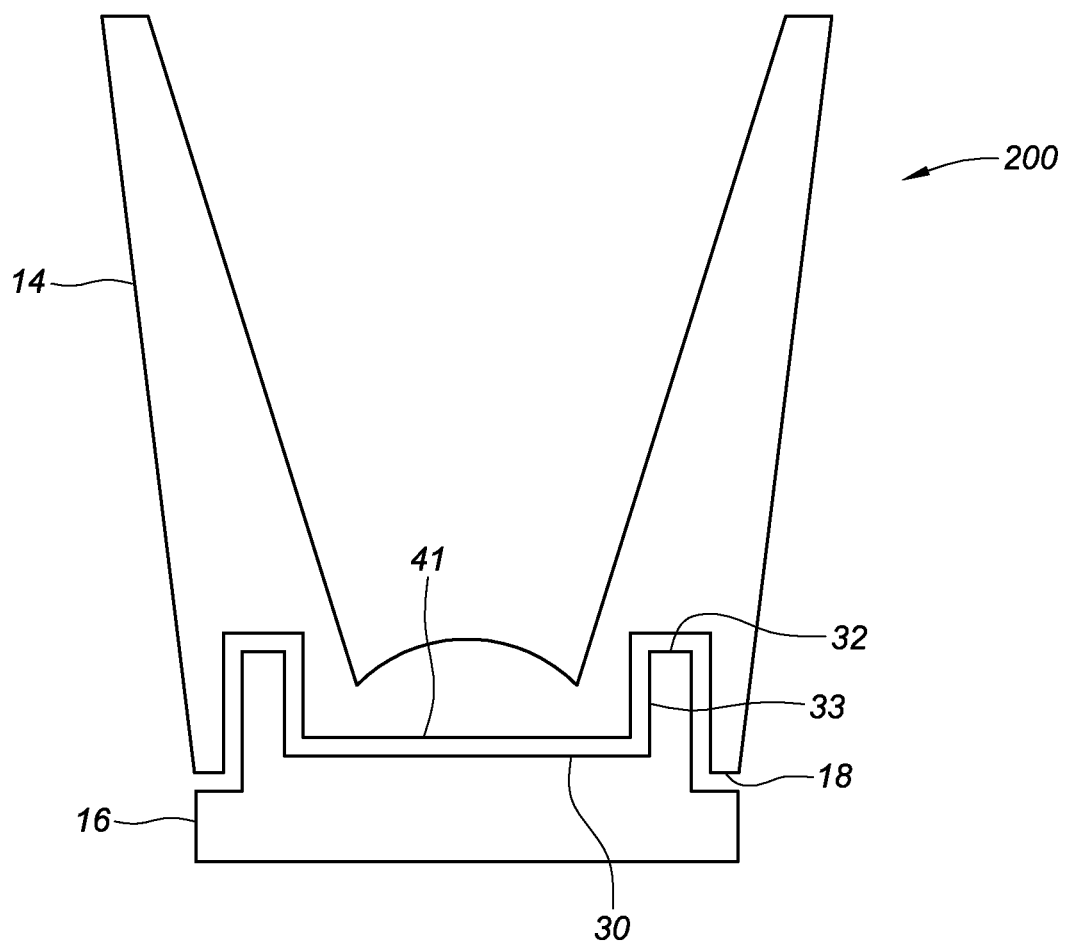
FIG. 5 illustrates a cross-sectional view of a system for supporting and charging a dental device where the walls of the charging base are vertical from the flat surface up to the protrusion and the vessel also has a lip that extends down below the bottom surface of the vessel.

FIG. 5 illustrates a cross-sectional view of a system 200 for supporting and charging a dental device where the walls 33 of the charging base 16 are vertical from the flat surface 30 up to the protrusion 32 and the vessel 14 also has a lip 18 that extends down below the bottom surface 41 of the vessel 14. As may also be appreciated from looking at FIG. 5, the embodiment shown has a channel with three sides similar to the design of the embodiment in FIG. 2. The embodiment shown in FIG. 5 may be thought of as a hybrid between the embodiments of FIG. 2 and FIG. 4.

Returning to FIG. 2, another aspect of the embodiments taught herein is the use of a magnet 24 in the base or handle of the dental device 12. In order to further stabilize the dental device 12 within the vessel 14, a magnet 24 may be located in the bottom of the handle of dental device 12. In preferred embodiments, the magnet 24 is located in the center bottom portion of the dental device 12. However, the magnet 24 may be located in any number of paces within the bottom of dental device 12. In some embodiments, the magnet 24 may be cylindrical and in other embodiments, the magnet 24 may be flat and cover the bottom of the dental device 12. It may be appreciated that a flat magnet 24 may still be considered cylindrical although it may not be if it has a different shape.

In operation, the magnet 24 creates a magnetic field that is large enough to interact with metallic portions of the charging base 16 when the dental device 12 is placed within the vessel 14. Accordingly, the magnet 24 helps secure and stabilize the dental device 12 within the assembly such that charging is continuous and reliable.

As one skilled in the art will appreciate after reading the specification above, many more embodiments are possible by combining the aspects taught herein in different combinations. Those embodiments are expressly included as part of this disclosure. Although the specification has explained the embodiments with reference to specific figures and examples, those descriptions are provided for example only and should not limit the full scope of the embodiments as claimed below.

What is claimed is:

1. An assembly for supporting and charging a dental device comprising:
a charging base wherein the charging base includes electronics to wirelessly charge a power system and wherein the charging base has a top with a first interfacing surface that has a first flat center portion with a first protrusion that sticks up above the first flat center portion and surrounds the first flat center portion;
a vessel having an interior surface and an exterior surface wherein the interior surface forms a cavity and wherein the exterior surface has a second interfacing surface designed to mate with the first interfacing surface wherein the second interfacing surface is on a bottom exterior surface of the vessel and wherein the second interfacing surface has a second flat center portion and a channel designed to receive the protrusion wherein the channel surrounds the second flat center portion and wherein the cavity has a cavity bottom and wherein a majority of the cavity bottom is covered by a second protrusion in the shape of a convex dome that is centered on the cavity bottom; and
a dental device with the power system located therein and wherein the dental device has a handle and a magnet is located proximal to a bottom of the handle.

2. The assembly of claim 1, wherein the dental device is an electric toothbrush.

3. The assembly of claim 1, wherein the height of the second protrusion is between 1 mm and 5 mm.

4. The assembly of claim 1, wherein the vessel is a cup.

5. The assembly of claim 4, wherein the vessel is made from glass.

6. The assembly of claim 1, wherein the second protrusion covers 90% or more of the cavity bottom.

7. The assembly of claim 1, wherein the exterior surface includes a lip that extends down below the second flat center portion and surrounds the channel on the bottom exterior surface of the vessel.

8. The assembly of claim 1, wherein walls of the first protrusion that extend up from the first flat center portion to a top of the first protrusion form a ninety-degree angle with the first flat center portion.

9. An assembly for supporting and charging a dental device comprising:
a charging base wherein the charging base includes electronics to wirelessly charge a power system and wherein the charging base has a top with a first interfacing surface that has a first flat center portion with a first protrusion that sticks up above the first flat center portion and surrounds the first flat center portion and wherein a charging coil is wound around an interior of the first protrusion;
a rinsing cup having an interior surface and an exterior surface wherein the interior surface forms a cavity and wherein the exterior surface has a second interfacing surface designed to mate with the first interfacing surface of the charging base and wherein the second interfacing surface is on a bottom exterior surface of the rinsing cup and wherein the second interfacing surface has a second flat center portion and a channel designed to receive the first protrusion wherein the channel surrounds the second flat center portion and wherein the cavity has a cavity bottom and wherein a majority of the cavity bottom is covered by a second protrusion in the shape of a convex dome that is centered on the cavity bottom; and
an electric toothbrush with the power system located therein and wherein the electric toothbrush has a handle and a magnet is located proximal to a bottom of the handle.

10. The assembly of claim 9, wherein the height of the second protrusion is between 1 mm and 5 mm.

11. The assembly of claim 9, wherein the rinsing cup is made from glass.

12. The assembly of claim 9, wherein the second protrusion covers 90% or more of the cavity bottom.

13. The assembly of claim 9, wherein the exterior surface includes a lip that extends down below the second flat center portion and surrounds the channel on the bottom exterior surface of the rinsing cup.

14. The assembly of claim 9, wherein walls of the first protrusion that extend up from the first flat center portion to a top of the first protrusion form a ninety-degree angle with the first flat center portion.

15. An assembly for supporting and charging a dental device comprising:
- a charging base wherein the charging base includes electronics to wirelessly charge a power system and wherein the charging base has a top with a first interfacing surface that has a first flat center portion with a first protrusion that sticks up above the first flat center portion and surrounds the first flat center portion and wherein a charging coil is wound around an interior of the first protrusion;
- a rinsing cup having an interior surface and an exterior surface wherein the interior surface forms a cavity and wherein the exterior surface has a second interfacing surface on a bottom of the rinsing cup wherein the second interfacing surface is designed to mate with the first interfacing surface of the charging base and wherein the second interfacing surface has a second flat center portion and a channel designed to receive the first protrusion wherein the channel surrounds the second flat center portion and wherein the cavity has a cavity bottom and wherein a majority of the cavity bottom is covered by a second protrusion in the shape of a convex dome that is centered on the cavity bottom; and
- an electric toothbrush with the power system located therein wherein the power system includes a pickup coil and wherein the electric toothbrush has a handle and a magnet and the pickup coil is located proximal to a bottom of the handle.

16. The assembly of claim 15, wherein the height of the protrusion is between 1 mm and 5 mm.

17. The assembly of claim 15, wherein the rinsing cup is made from glass.

18. The assembly of claim 15, wherein the second protrusion covers 90% or more of the cavity bottom.

19. The assembly of claim 15, wherein the exterior surface includes a lip that extends down below the second flat center portion and surrounds the channel on the bottom exterior surface of the rinsing cup.

20. The assembly of claim 15, wherein walls of the first protrusion that extend up from the first flat center portion to a top of the first protrusion form a ninety-degree angle with the first flat center portion.

\* \* \* \* \*